(12) United States Patent
Tsai (10) Patent No.: US 6,938,905 B1
(45) Date of Patent: Sep. 6, 2005

(54) HAND TRUCK (76) Inventor: Haiming Tsai, P.O. Box 6-9, Tainan (TW)

( * ) Notice: Subject to any disclaimer, the term of this patent is extended or adjusted under 35 U.S.C. 154(b) by 0 days.

(21) Appl. No.: 10/981,041

(22) Filed: Nov. 5, 2004

(51) Int. Cl.⁷ ................................................ B62B 3/02
(52) U.S. Cl. ............................. 280/47.29; 280/47.28; 280/30; 280/47.18; 280/47.2
(58) Field of Search .................... 280/47.29, 47.27, 280/47.28, 47.24, 47.18, 30, 43.1, 43.11, 280/43.131, 47.15, 47.17, 47.2, 47.21, 47.23, 280/47.26, 79.3, 79.5, 79.6, 47.315, 47.36, 280/47.371

(56) References Cited

U.S. PATENT DOCUMENTS

| | | | |
|---|---|---|---|
| 794,741 A * | 7/1905 | Pray ........................ 280/47.28 |
| 3,176,167 A | 3/1965 | Vosseler | |
| 3,582,540 A | 6/1971 | Adler | |
| 3,612,664 A | 10/1971 | Berman | |
| 3,736,532 A | 5/1973 | Armenakas | |
| 3,785,669 A * | 1/1974 | Doheny ................... 280/47.18 |
| 3,902,084 A | 8/1975 | May, Jr. | |
| 3,958,117 A | 5/1976 | Stauffer | |
| 4,009,891 A * | 3/1977 | Jensen ........................ 280/651 |
| 4,184,759 A | 1/1980 | Ito | |
| 4,277,948 A | 7/1981 | Horn | |
| 4,629,308 A | 12/1986 | Landa | |
| 4,781,053 A | 11/1988 | Stewart | |
| 5,036,245 A | 7/1991 | Ohnishi | |
| 5,045,747 A | 9/1991 | Chen | |
| 5,091,781 A | 2/1992 | An | |
| 5,127,982 A | 7/1992 | Kotake | |
| 5,134,334 A | 7/1992 | Onishi | |
| 5,157,435 A | 10/1992 | Min | |
| 5,211,101 A | 5/1993 | Letsch | |
| 5,228,716 A * | 7/1993 | Dahl ........................ 280/651 |
| 5,296,943 A | 3/1994 | Goebel | |
| 5,357,308 A | 10/1994 | Goo | |
| 5,410,206 A | 4/1995 | Luecke | |
| 5,434,621 A | 7/1995 | Yu | |
| 5,446,330 A | 8/1995 | Eda | |
| 5,453,653 A | 9/1995 | Zumeris | |
| 5,476,282 A * | 12/1995 | Dahl ........................ 280/651 |
| 5,536,034 A * | 7/1996 | Miller ........................ 280/651 |
| 5,605,659 A | 2/1997 | Moynihan | |
| 5,663,606 A | 9/1997 | Beurrier | |
| 5,739,624 A | 4/1998 | Kleiman | |
| 5,739,626 A | 4/1998 | Kojima | |
| 5,763,983 A | 6/1998 | Huang | |
| 5,769,554 A | 6/1998 | Slocum | |
| 5,792,379 A | 8/1998 | Dai | |
| 5,814,917 A | 9/1998 | Isobe | |
| 5,894,371 A | 4/1999 | Wrobel | |
| 5,943,513 A | 8/1999 | Kim | |
| 5,969,886 A | 10/1999 | Sato | |
| 5,982,075 A | 11/1999 | Hayasaka | |

(Continued)

OTHER PUBLICATIONS

Sybil P. Parker, "McGraw-Hill Dictionary of Scientific and Technical Terms," 1989, p. 1253, 4th Edition, McGraw-Hill Book Company, New York, U.S.A.

(Continued)

Primary Examiner—J. Allen Shriver (57) ABSTRACT

A hand truck includes a main frame, a movable frame pivotally connected with the main frame, a wheel set, and a handle able to be connected with the main frame with its height adjustable or to be connected with a handle receiving short tube fixed upright on the main frame in case of transforming the two wheeled hand tuck, two wheel supporters fixed under the main frame for additionally combining two independent wheels for transforming the two wheeled hand truck into a four wheeled one.

3 Claims, 7 Drawing Sheets

U.S. PATENT DOCUMENTS

| | | | |
|---|---|---|---|
| 6,101,840 A | 8/2000 | Watanabe | |
| 6,125,701 A | 10/2000 | Sugitani | |
| 6,142,749 A | 11/2000 | Jack | |
| 6,145,805 A | 11/2000 | Smith, III | |
| 6,147,435 A | 11/2000 | Fujimura | |
| 6,170,202 B1 | 1/2001 | Davoodi | |
| 6,234,497 B1 * | 5/2001 | Stahler, Sr. | 280/47.29 |
| 6,236,448 B1 | 5/2001 | Ota | |
| 6,257,845 B1 | 7/2001 | Jack | |
| 6,302,414 B1 * | 10/2001 | Berthiaume et al. | 280/47.18 |
| 6,325,351 B1 | 12/2001 | Hale | |
| 6,328,319 B1 * | 12/2001 | Stahler, Sr. | 280/47.18 |
| 6,364,328 B1 * | 4/2002 | Stahler, Sr. | 280/47.18 |
| 6,364,331 B1 * | 4/2002 | Yap | 280/47.371 |
| 6,375,200 B1 * | 4/2002 | Harter | 280/30 |
| 6,439,282 B1 | 8/2002 | Kimura | |
| 6,445,514 B1 | 9/2002 | Ohnstein | |
| 6,525,456 B1 | 2/2003 | Kim | |
| 6,588,775 B2 * | 7/2003 | Malone, Jr. | 280/47.18 |
| 6,591,608 B2 | 7/2003 | Langenfeld | |
| 6,606,426 B2 | 8/2003 | Laor | |
| 6,678,240 B2 | 1/2004 | Geh | |
| 6,758,482 B2 * | 7/2004 | Stallbaumer | 280/47.27 |
| 2003/0062700 A1 * | 4/2003 | Stallbaumer | 280/47.27 |

OTHER PUBLICATIONS

Eugene A. Avallone et al., "Mark's Standard Handbook for Mechanical Engineers," 1978, p. 5-59 to 5-70, 8-9 to 8-90, 9th Edition, McGraw-Hill Book Company, New York, U.S.A.

* cited by examiner

HAND TRUCK

BACKGROUND OF THE INVENTION

1. Field of the Invention

This invention relates to a hand truck, particularly to one convertible to a two wheeled or a four wheeled one according to necessity for practical and convenient use.

2. Description of the Prior Art

Figure 1:
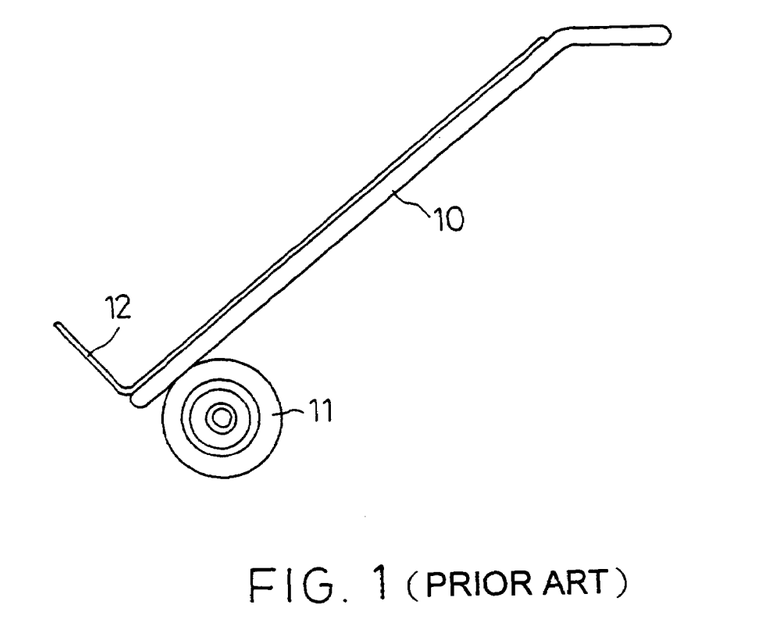
FIG. 1 is a perspective view of a conventional hand truck.
Figure 2:
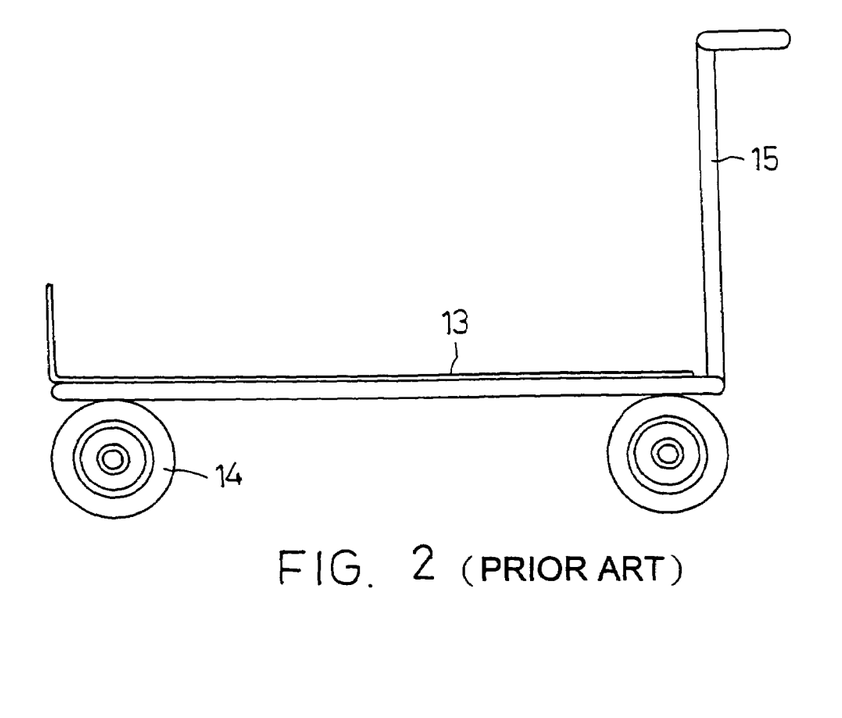
FIG. 2 is a perspective view of another conventional hand truck.
Figure 3:
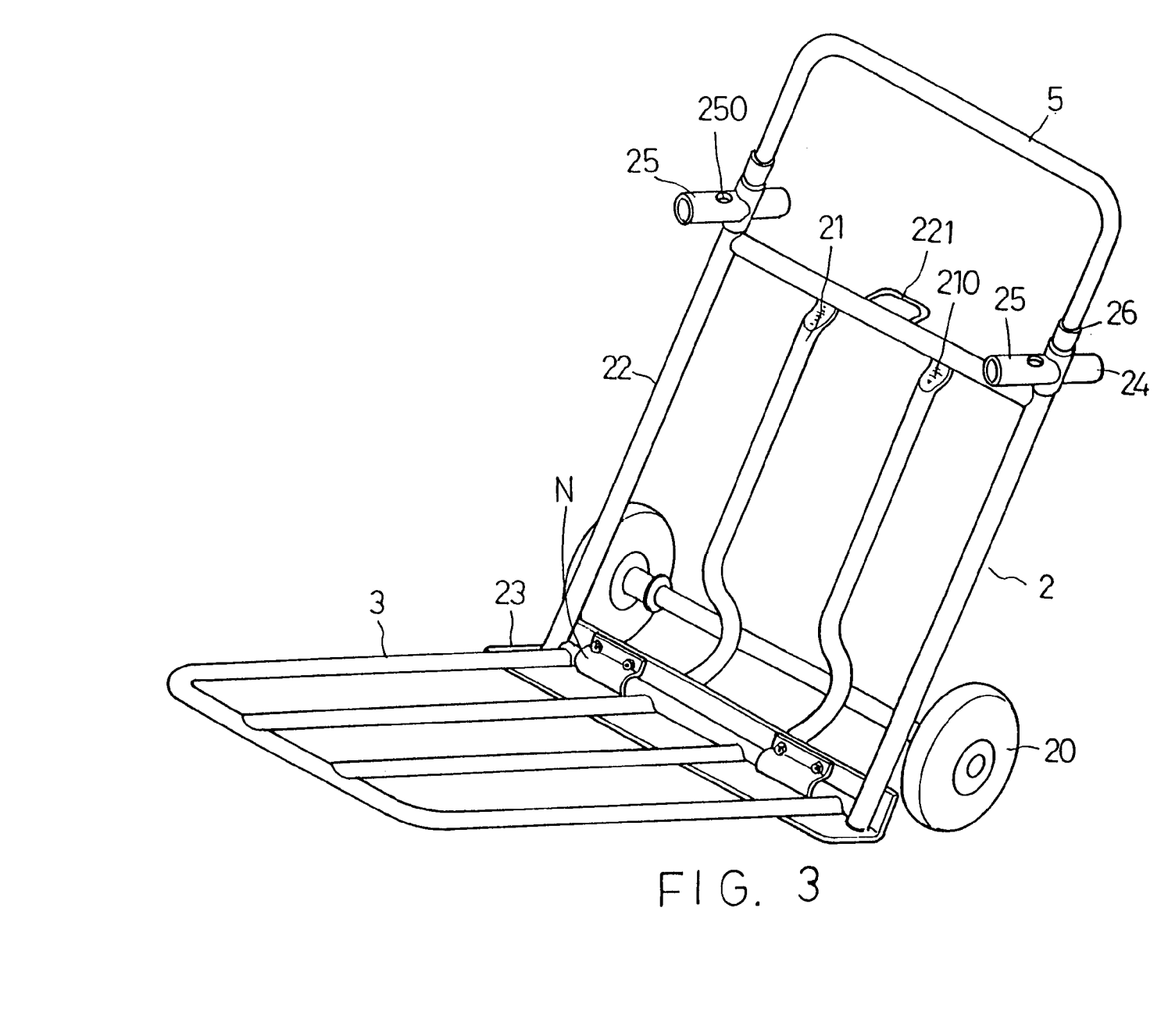
FIG. 3 is a perspective view of a hand truck used a two wheeled one in the present invention.
Figure 4:
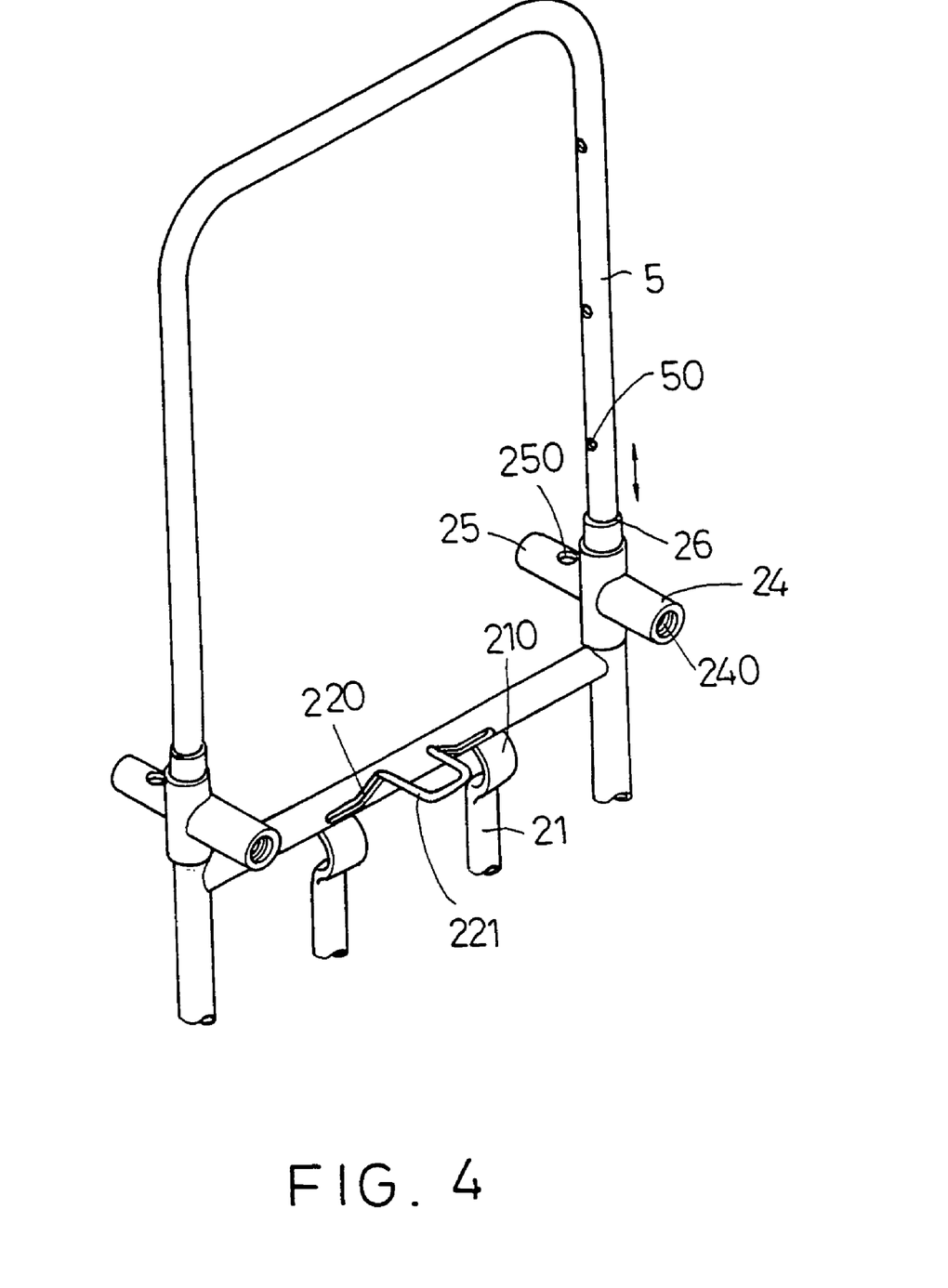
FIG. 4 is a perspective view of a handle to be raised or lowered in two side rods of a main frame in the present invention.
Figure 5:
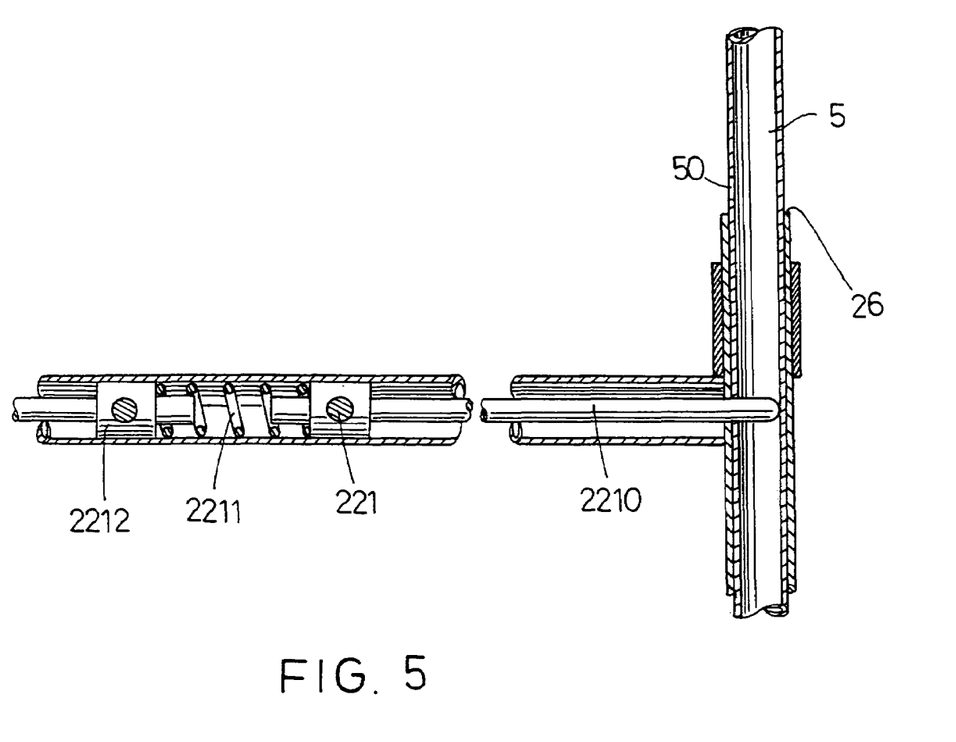
FIG. 5 is a cross-sectional view of an elastic rod and its relative components in the present invention.
Figure 6:
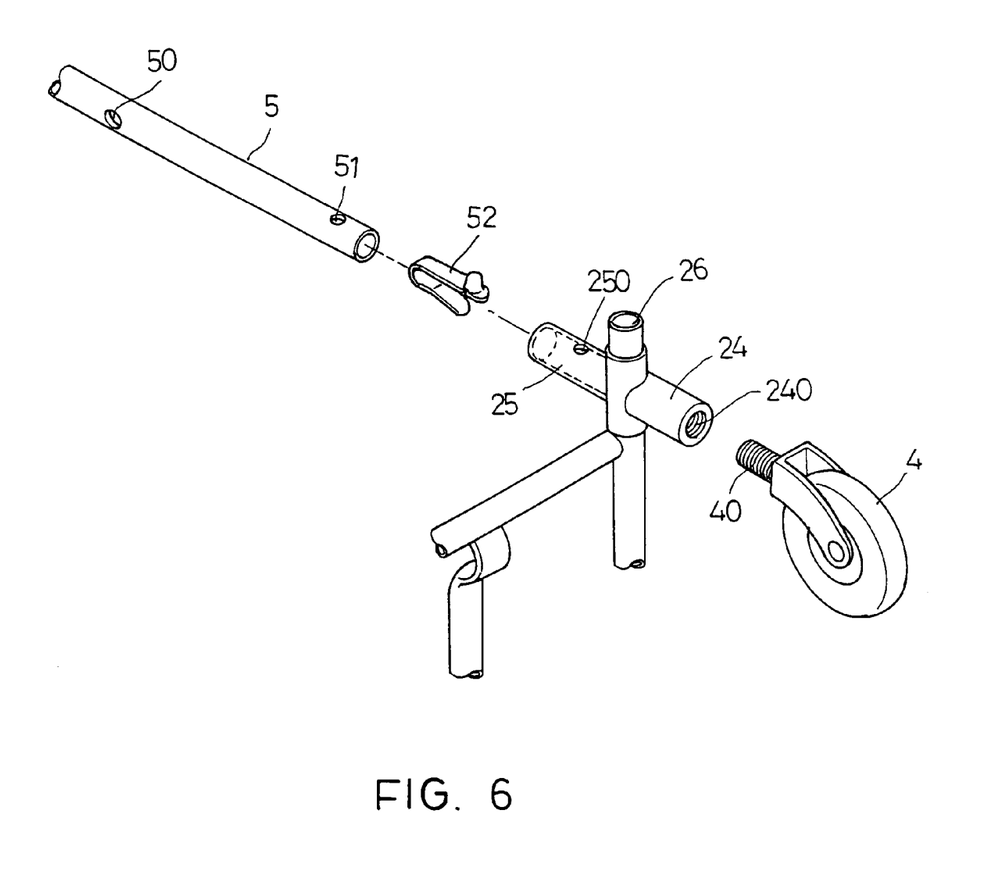
FIG. 6 is a partial exploded perspective view of the handle, an independent wheel, a wheel supporter, and an upper end of two side rods of a main frame in the present invention.

A conventional hand truck shown in FIGS. 1 and 2 is a two wheel hand truck, which includes a frame 10, two wheels 11 pivotally connected under the frame 10, a nose prongs 12 fixed with the front side of the frame 10 and normally standing on the ground, and after load is supported by the nose prongs 12 and the frame 10 is pushed down with the wheels 11 as a fulcrum to let the nose prongs 12 moved up leaving the ground. Then the hand truck can be pushed to move around.

Another conventional hand truck shown in FIG. 2 is a four wheel hand truck, which includes a flat platform 13, four wheels 14 pivotally combined under the four corners of the platform 13, and a handle support rods 15 for supporting a handle used for pushing the hand truck.

The two kinds of conventional hand trucks described above have different using modes, the former is two wheeled and rather simply structured and not so heavy, and the latter is four wheeled and rather heavy but comparatively stable. If the two hand trucks have to be used at the same time, a user has to spend much expense to get them. In addition, two hand trucks may occupy more rooms for storing.

SUMMARY OF THE INVENTION

This invention has been devised to offer a hand truck usable as a two wheeled or a four wheeled one, and easily convertible from a two wheeled one to a four wheeled one and vice versa.

The feature of the invention is a movable frame pivotally connected with a main frame and a handle able to be connected with the main frame for using the hand truck as a two wheeled one and able to be connected to a handle receiving short tube fixed upright on the main frame for using the hand truck as a four wheeled one by adding two independent wheels to two wheel supporters fixed under the main frame.

BRIEF DESCRIPTION OF DRAWINGS

This invention will be better understood by referring to the accompanying drawings, wherein.

DETAILED DESCRIPTION OF THE PREFERRED EMBODIMENT

A preferred embodiment of a hand truck in the present invention, as shown in FIGS. 3, 4, 5, 6, 7, and 8, includes a main frame 2, a movable frame 3, a wheel set 20, two independent wheels 4, a handle 5 and a clamp 6 as main components combined together.

The main frame 2 is nearly square-shaped, having two intermediate support rods 21 and two vertical side rods 22 in parallel to the support rods 21 positioned between, and an elongate L-shaped plate 23 welded with two lower ends of the two vertical side rods 22. The support rods 21 respectively have a support groove 210 on their upper ends.

Further, an upper side rod of the main frame 2 is provided with two slide grooves 220 space apart, and a elastic rod 221 has a U-shaped portion and an extending from the two end to fit in the slide grooves 220. The extensions of the rod 221 have the inner ends fixed with an inner end of a stop bar 2210 respectively received in two ends of the upper side rod of the main frame, a spring 2211 fitted between two rings 2212 fixed tightly around the inner end of each stop bar 2210 in the upper side rod of the main frame 2.

The wheel set 20 consists of two wheels and an axle connected with the two wheels rotatable, and the axle is welded with a curved-down section of the two support rods 21.

Further a tubular wheel supporter 24 with female threads 240 is fixed tightly respectively under the upper ends of the two side rods 22 of the main frame 2 and a handle receiving short tube 25 is fixed respectively on the upper ends of the two side rod 22 just aligned with the wheel supporters 24. Then the upper ends of the two side rods 22 have end holes 26 for two ends of a handle 5 to fit movably therein.

The movable frame 3 is shaped like a square, having a lower side rod pivotally wrapped around by two sleeves (N) fastened tightly on the elongate L-shaped plate 23, possible to swing up to rest nearly upright on the support rods 21 with the lower side rod functioning as a pivot, with the upper side rod fitting in the support grooves 210 of the support rods 21. Further, the movable frame 3 can be swung down from the upright position to a horizontal position in a right angle to the main frame 2 to rest on the ground.

The two independent wheels 4 are to be screwed with the two tubular wheel supporters 24 of the main frame 2, having male threads 40 on a rod to engage with the female threads 240 of the wheel supporters 24. The two independent wheels 4 is added to the hand truck to transform the original hand truck of the two wheels into a four wheeled hand truck, and convertible back to the two wheeled hand truck.

The handle 5 is U-shaped, and has its two ends inserted in the upper end holes 26 of the two side rods 22, if the hand truck is used as the two wheeled one. But the handle 5 has its two ends inserted in the handle receiving short tubes 25, if the hand truck is used as the four wheeled one. Further, the handle 5 has plural position holes 50 spaced apart properly, and engage holes 51 and an elastic hook 52 fitting in the end holes 51 of the handle 5 to keep it at the connected position stably.

A clamp 6 is further provided for clamping the upper side rod of the main frame and the upper side of the movable frame 3 swung to the level position with the main frame 2.

In using, if the hand truck is to be used as a two wheeled one, the movable frame 3 is swung down from the upright position on the main frame 2 to the horizontal position, with the upper side of the movable frame 3 separating from the support grooves 210 of the support rods 21 and stopped by the L-shaped plate 23 at the horizontal position. Then the elastic rod 221 is constricted, compressing the spring 2211, to let the two rings 2212 shrink inward in the slide grooves 220 so that the two stop bars 2210 may move inward and retreat from one of the position holes 50 of the handle 5, permitting the handle 5 move up or down with the two side portions slide up and down in the two side rods 22. Then the handle 5 can be adjusted in its height (or length) relative to the main frame 2 and then secured at that position by releasing the elastic rod 221 and with the spring elastically lengthening to force the stop bars 2210 move outward and insert in one of the position holes 50 of the handle 5 to secure the handle 5 at the adjusted position. So a user can adjust the length (or the height) of the handle 5 for convenience of pushing the hand truck.

If the hand truck is to be used as a four wheeled one, the main frame 2 is to be swung down to rest on the ground with the movable frame 3 swung down from the upright position to rest level on the main frame 2 with its upper side rod fitting on the support grooves 210 of the support rods 21, and the independent wheels 4 are screwed respectively with the wheel supporters 24. Then the elastic rod 221 is constricted to let the stop bars 2210 retreat from the position holes 50 of the handle 5, which is then pulled off the end holes 26 of the side rods 22. Next, the two ends of the handle 5 are inserted in the handle receiving short tubes 25 and the two elastic hooks 52 of the handle 5 are made to hook the hook holes 250 of the handle receiving short tubes 25 so the handle 5 may be secured stably for pushing or pulling the four wheeled hand truck formed.

In general, the hand truck according to the invention can be used as a two wheeled or four wheeled one by easily transforming alternately, having the following advantages.

Figure 7:
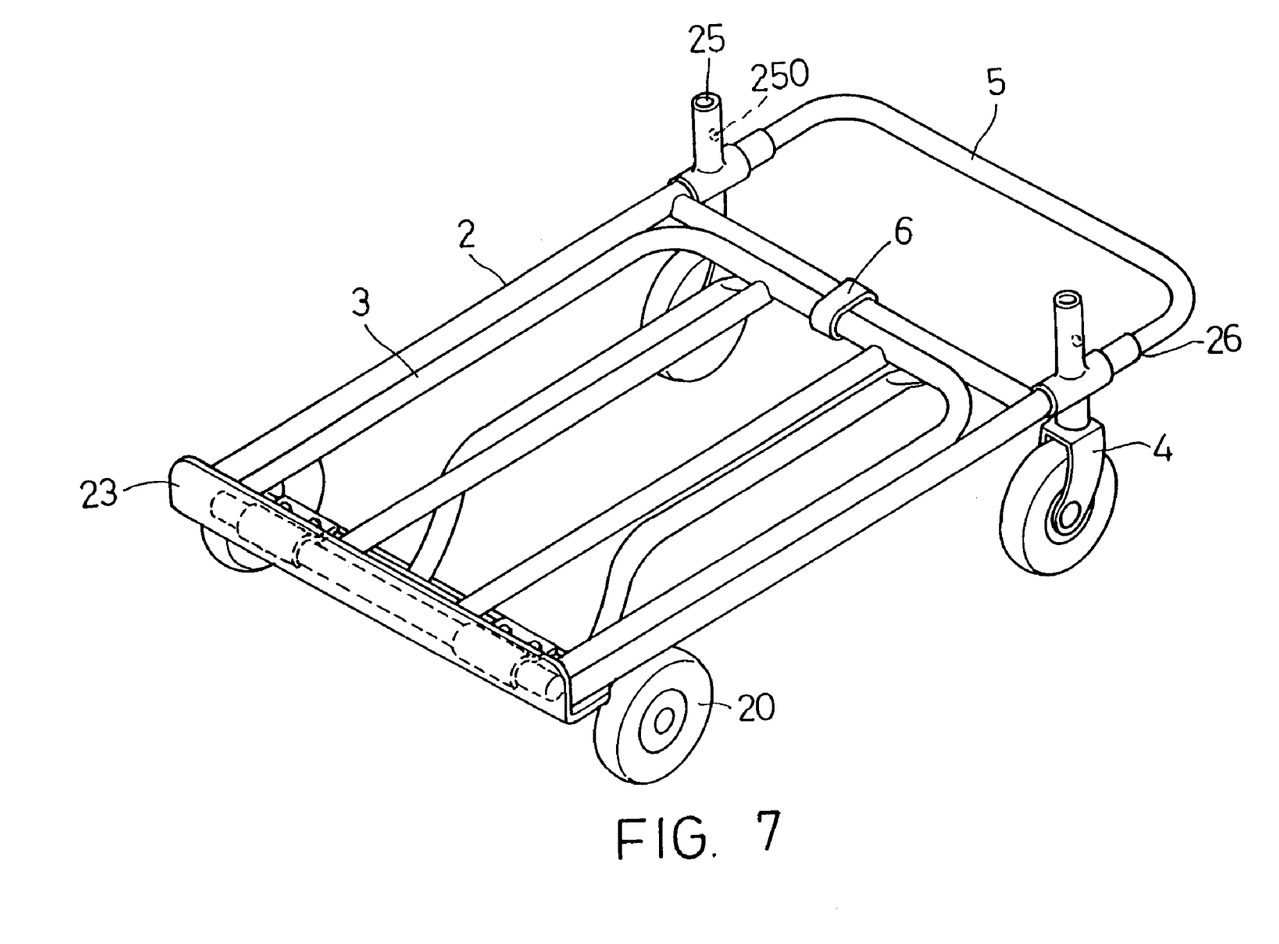
FIG. 7 is a perspective view of the hand truck in the two wheeled condition with the movable frame swung on the main frame for transforming it into a four wheeled one in the present invention; and, FIG. 8 is a perspective view of the hand truck in the four wheeled condition with the handle fitting in the handle receiving short tubes fixed on the side rods of the main frame in the present invention.
Figure 8:
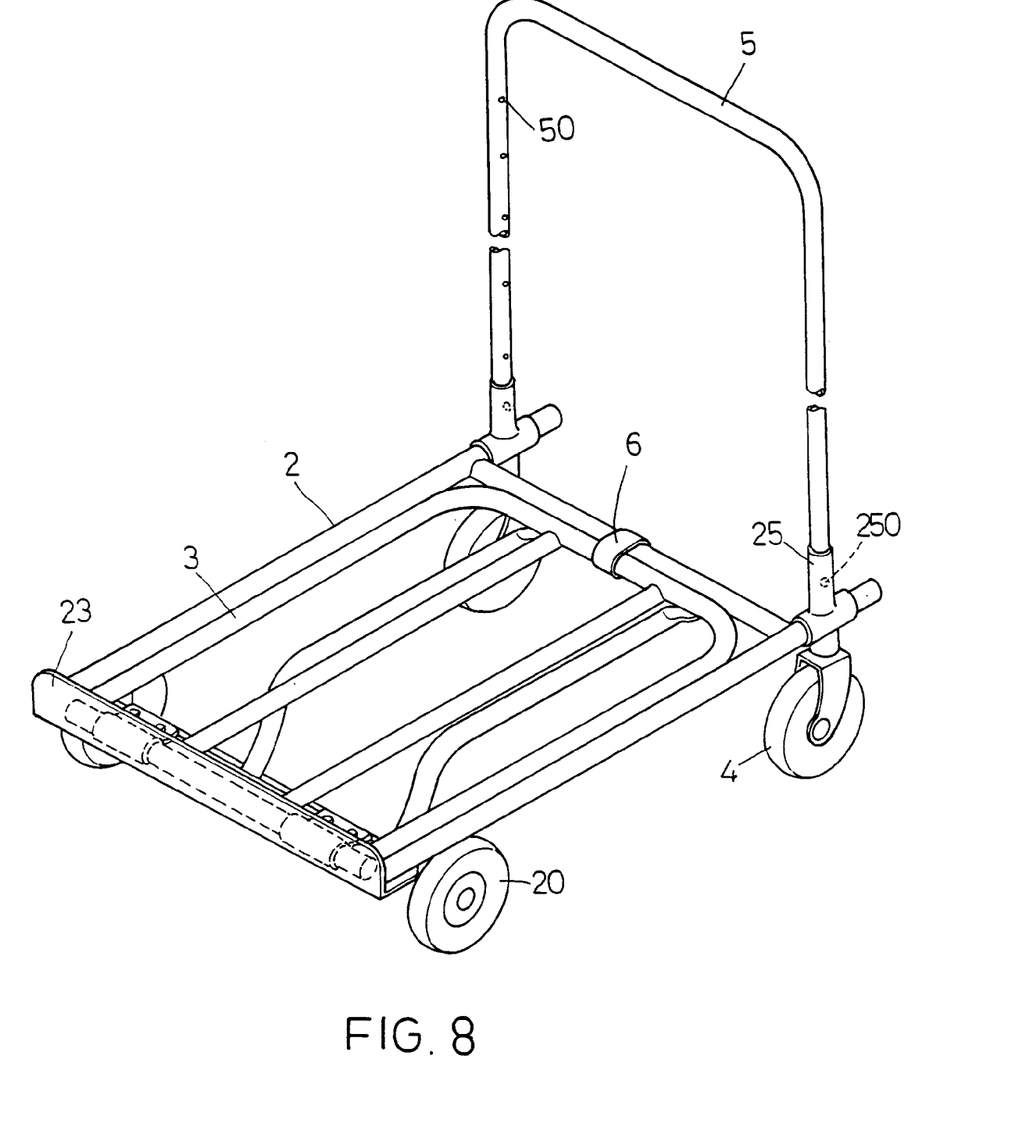

1. When the hand truck is used as a two wheeled one, the movable frame supporting load and the main frame stopping the vertical side of the load from falling.
2. When the hand truck is used as a four wheeled one, the movable frame is swung to lie level on the main frame, with the upper side rod of the movable fame 21 fitting on the support grooves 210 of the support rods so as to reinforce the support force for the load.
3. The handle can be adjusted in its length to conform to a user's body for operation.
4. The hand truck can be used as a two wheeled or a four wheeled one, and easily convertible and very convenient to use.
5. The length of the handle 5 is easily adjusted by handling the elastic rod 221, which is constricted or released to shrink or lengthen by means of the spring 2211 in the slide grooves 220 to loosen or secure the handle 5 at one of the adjustable length relative to the main frame 2.

While the preferred embodiment of the invention has been described above, it will be recognized and understood that various modifications may be made therein and the appended claimed are intended to cover all such modifications that may fall within the spirit and scope of the invention.

What is claimed is:

1. A hand truck comprising:
   a main frame consisting of two vertical side rods, two intermediate support rods positioned in parallel to and between said vertical side rods, an upper side rod combined with said two side rods and said two support rods, and an L-shaped elongate plate welded tightly with a lower end of said two vertical side rods to form a lower side of said main frame, said two vertical side rods respectively provided with a position hole near its upper end;
   a wheel set consisting of two wheels rotatably combined with two ends of an axle and welded tightly with a curved-down section of said two support rods of said main frame;
   an elastic rod having a U-shaped portion and an extension extending from the two ends of said U-shaped portion, said extensions respectively extending in two slide grooves formed spaced apart in line in the upper side rod of said main frame, said extensions respectively having an inner end connected firmly with an inner end of a stop bar laid in said upper side rod of said main frame, an outer end of said stop bar inserting in one of plural position holes of two vertical sides of said handle so as to secure said handle at one of plural positions relative to said main frame;
   a movable frame shaped square and having a circumferential rod and two rods positioned in parallel in said circumferential rod, said circumferential rod having its lower side pivotally wrapped around by two sleeves fastened tightly on said elongate L-shaped rod;
   a U-shaped handle having two ends respectively able to be inserted in two end holes of the upper ends of said two side rods of said main frame, said handle further having plural position holes spaced apart in its two side portions and a hook hole in the two side portions, an elastic hook respectively fitted in two ends of the handle;
   a tubular wheel supporter respectively fixed downward at the upper end of said two side rods of said mainframe;
   a handle receiving short tube respectively fixed in line with said tubular wheel supporter on the upper end of said two side rods of said main frame;
   said movable frame swung to position flat on the ground with its lower side functioning as a pivot rotating in said two sleeves in nearly a right angle to said main frame for supporting a load placed thereon, said handle having its two sides fitted in the two upper end holes of said side rods of said main frame and adjusted in its height relative to said upper side rod of said main frame by handling said elastic rod, said hand truck used as a two wheeled hand truck by using said handle lowered a little to let said elongate L-shaped plate of said main frame move up from the ground and pushed to move forward to transport the load on said movable frame.

2. The hand truck as claimed in claim 1, wherein said support rods of said main frame have a support groove formed on its upper end for supporting the upper side rod of said movable frame in a level condition for increasing the volume of a load possible to be placed thereon.

3. The hand truck as claimed in claim 1, wherein two independent wheels are further provided to have a threaded rod to engage with said tubular wheel supporter, said main frame is swung down to let said two independent wheels combined with said wheel supporters to stand on the ground, said handle is separated from the two upper end holes of said two vertical side rods of said main frame, the two ends of said handle are inserted in the handle receiving short tubes at the two upper ends of said two side rods of said main frame, said elastic hooks in said two sides of said handle hook the position hole of said handle and said handle receiving short tube to secure said handle, said movable frame is swung on said main frame, with the upper side of said movable frame resting on the supporting grooves of said support rods, said main frame together with said movable frame supporting a load placed thereon, and thus said hand truck can be used as a four wheeled hand truck.

* * * * *